United States Patent
Newbill et al.

(10) Patent No.: US 11,512,413 B2
(45) Date of Patent: Nov. 29, 2022

(54) POROUS FLEXIBLE WOVEN BELT

(71) Applicant: Milliken & Company, Spartanburg, SC (US)

(72) Inventors: Thomas W. Newbill, LaGrange, GA (US); Dennis A. Goff, Chesnee, SC (US); Danny Steele, Enoree, SC (US)

(73) Assignee: Milliken & Company, Spartanburg, SC (US)

( * ) Notice: Subject to any disclaimer, the term of this patent is extended or adjusted under 35 U.S.C. 154(b) by 314 days.

(21) Appl. No.: 16/808,813

(22) Filed: Mar. 4, 2020

(65) Prior Publication Data

US 2020/0308732 A1    Oct. 1, 2020

Related U.S. Application Data

(60) Provisional application No. 62/824,681, filed on Mar. 27, 2019.

(51) Int. Cl.
| | |
|---|---|
| *A01G 24/40* | (2018.01) |
| *D03D 1/00* | (2006.01) |
| *A01G 33/00* | (2006.01) |

(52) U.S. Cl.
CPC .......... *D03D 1/0094* (2013.01); *A01G 33/00* (2013.01); *D10B 2331/04* (2013.01)

(58) Field of Classification Search
CPC ... D03D 1/0094; A01G 33/00; D10B 2331/04
See application file for complete search history.

(56) References Cited

U.S. PATENT DOCUMENTS

| | | | | |
|---|---|---|---|---|
| 5,507,899 | A |   | 5/1996 | Watanabe et al. ............. 156/154 |
| 5,590,755 | A |   | 1/1997 | Daringer et al. ............. 198/778 |
| 5,651,641 | A | * | 7/1997 | Stephens ................ D04H 11/00 |
| | | | | 428/92 |
| 5,769,131 | A | * | 6/1998 | Whitlock .............. D21F 1/0054 |
| | | | | 162/904 |
| 5,819,811 | A | * | 10/1998 | Baker ................... D21F 1/0027 |
| | | | | 162/902 |
| 6,179,013 | B1 | * | 1/2001 | Gulya ................... D21F 1/0045 |
| | | | | 139/383 A |

(Continued)

OTHER PUBLICATIONS

Patent Cooperation Treaty PCT International Search Report, dated May 8, 2020. International Application No. PCT/US2020/021194. International Filing Date: Mar. 5, 2020.

*Primary Examiner* — Robert H Muromoto, Jr.
(74) *Attorney, Agent, or Firm* — Cheryl J. Brickey

(57) ABSTRACT

The invention relates to a flexible belt comprising a woven fabric. The woven fabric has approximately parallel straight sides and ends, where the ends are releasably or permanently securable to one another to form an endless loop. The woven fabric contains a set of warp yarns and a set of weft yarns. The set of warp warps are in a warp yarn direction and the warp yarns comprise monofilament warp yarns having a first denier. The set of weft yarns are in a weft yarn direction which is approximately perpendicular to the warp yarn direction. The weft yarns are in a repeating pattern of at least one monofilament weft yarn followed by at least one multifilament weft yarn. The monofilament weft yarn has a linear mass density of at least about 2,500 denier and at least about 5 times the denier of the monofilament warp yarn.

15 Claims, 2 Drawing Sheets

(56) References Cited

U.S. PATENT DOCUMENTS

| | | | |
|---|---|---|---|
| 6,337,112 B1 | 1/2002 | Watanabe et al. | 428/34.7 |
| 6,647,662 B2 * | 11/2003 | Toye | A01G 13/0268 |
| | | | 47/9 |
| 7,059,360 B1 * | 6/2006 | Majaury | D21F 1/0045 |
| | | | 162/900 |
| 8,333,220 B2 * | 12/2012 | King | D03D 15/46 |
| | | | 139/408 |
| 9,334,122 B2 | 5/2016 | Shoji et al. | |
| 9,763,398 B2 | 9/2017 | Deane | |
| 9,771,684 B2 | 9/2017 | Zou et al. | |
| 9,932,549 B2 | 3/2018 | Gross et al. | |
| 9,938,492 B2 | 4/2018 | Gressel et al. | |
| 10,197,338 B2 | 2/2019 | Melsheimer | |
| 10,366,628 B2 | 7/2019 | White et al. | |
| 10,488,110 B2 * | 11/2019 | Emminger | F26B 17/023 |
| 10,538,882 B2 * | 1/2020 | LeBrun | B32B 5/028 |
| 10,815,620 B2 | 10/2020 | Sealey et al. | |
| 10,836,074 B2 * | 11/2020 | Haiden | D21F 1/00 |
| 11,226,463 B2 * | 1/2022 | Bedingfield | B32B 1/06 |
| 2003/0015248 A1 * | 1/2003 | Itoh | D03D 15/00 |
| | | | 442/209 |
| 2004/0127129 A1 * | 7/2004 | Luo | D21F 7/083 |
| | | | 442/362 |
| 2013/0136904 A1 * | 5/2013 | Nair | B32B 27/32 |
| | | | 428/196 |
| 2014/0127776 A1 * | 5/2014 | Picard | A01G 33/00 |
| | | | 435/178 |

\* cited by examiner

FIG. -1-

POROUS FLEXIBLE WOVEN BELT

RELATED APPLICATIONS

This application claims priority to Provisional Patent Application 62/824,681 filed on Mar. 27, 2019, which is herein incorporated by reference in its entirety.

TECHNICAL FIELD OF THE INVENTION

The invention provides a flexible woven belt for use in systems such as an algal growth system.

BACKGROUND

Algae-based wastewater treatment is gaining ground as an alternative to traditional treatment practices, because it has the potential to treat wastewater without aeration, through the symbiotic growth of bacteria and photosynthetic microalgae (algae and cyanobacteria) and preserve the chemical energy in wastewater in grown biomass. Thus, a successful microalgae process could substantially reduce energy usage for wastewater treatment and recover chemical energy from wastewater in the form of bio feedstock. However, engineering challenges limit the adoption of microalgae processes. There is a need for an algal growth system utilizing a belt of woven fabric that can facilitate the growth and attachment of algae.

BRIEF SUMMARY OF THE INVENTION

The invention relates to a flexible belt comprising a woven fabric. The woven fabric has approximately parallel straight sides and ends, where the ends are releasably or permanently securable to one another to form an endless loop. The woven fabric has an upper and lower surface and contains a set of warp yarns and a set of weft yarns. The set of warp warps are in a warp yarn direction and the warp yarns comprise monofilament warp yarns having a first denier. The set of weft yarns are in a weft yarn direction which is approximately perpendicular to the warp yarn direction. The weft yarns are in a repeating pattern of at least one monofilament weft yarn followed by at least one multifilament weft yarn. The monofilament weft yarn has a linear mass density of at least about 2,500 denier and at least about 5 times the denier of the monofilament warp yarn.

DETAILED DESCRIPTION OF THE INVENTION

Figure 1:
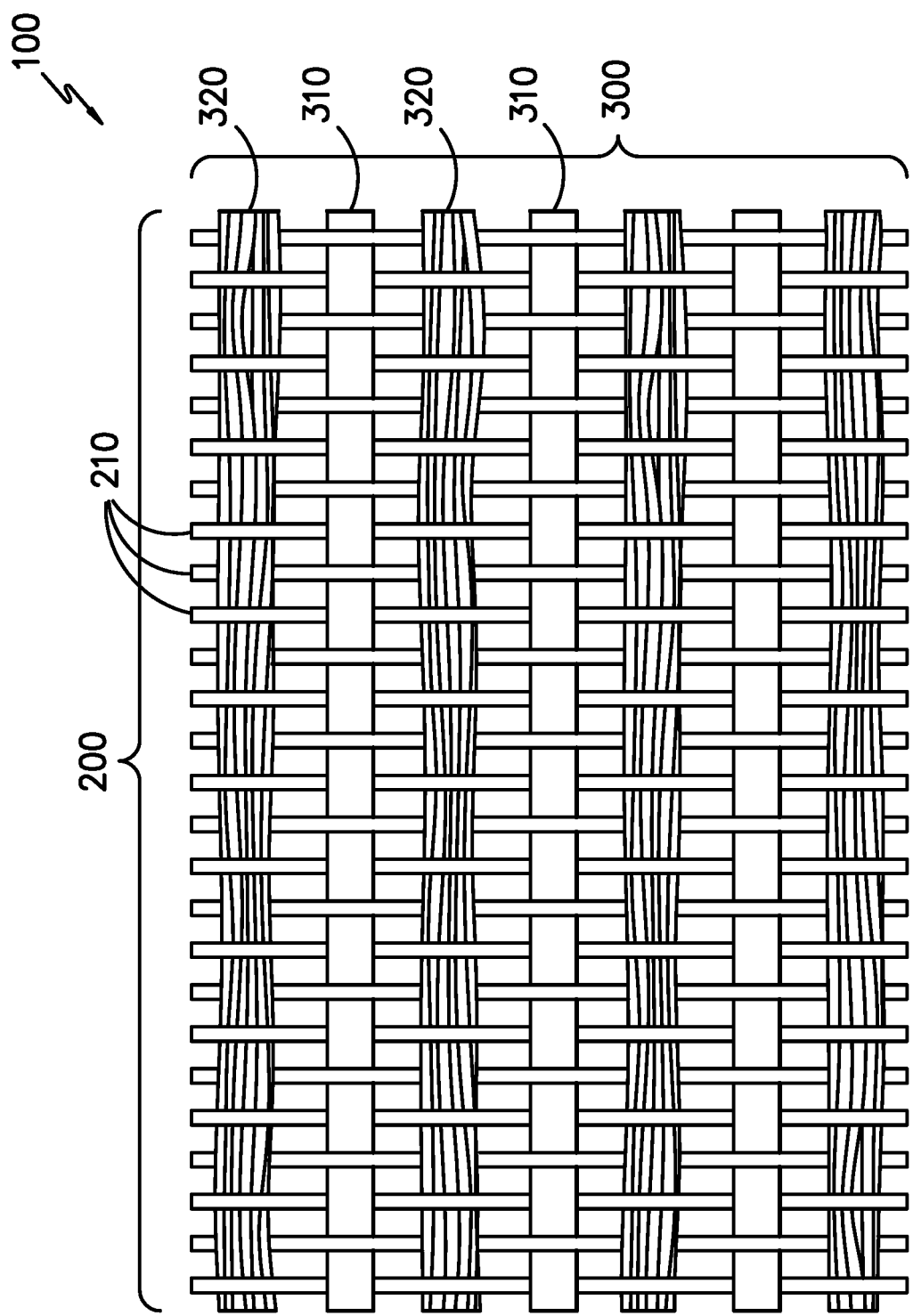
FIG. 1 is an illustrative schematic of a woven fabric according to one embodiment of the invention.
Figure 2:
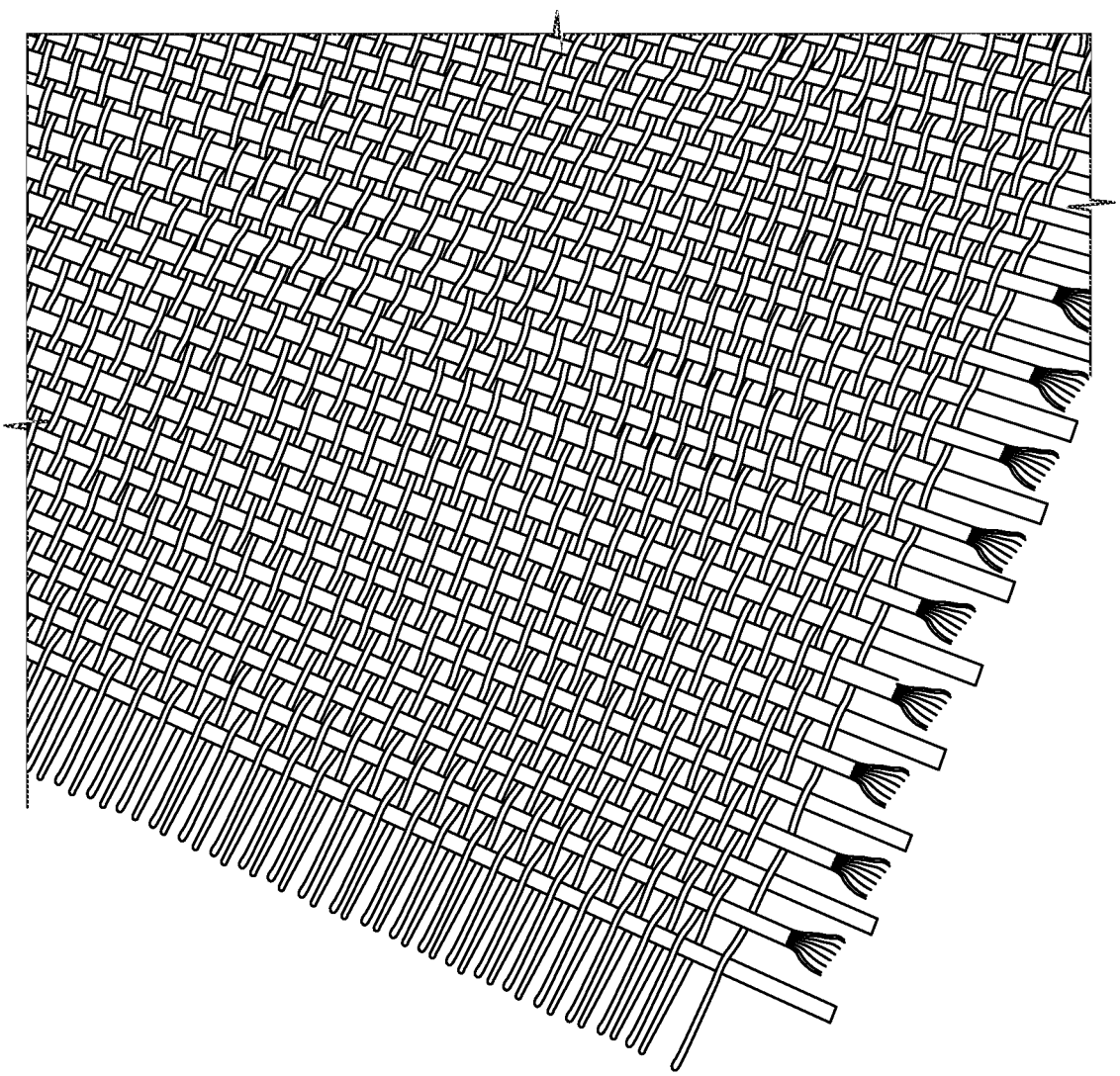
FIG. 2 is a photograph of a woven fabric according to one embodiment of the invention.

Referring now to FIG. 1, there is shown one embodiment of a woven fabric 100 suitable for use in the flexible belt. The woven fabric contains a set of warp yarns 200 and a set of weft yarns 300. The set of warp yarns 200 contain warp yarns 210 that run along the machine direction as the woven fabric 100 is produced. The set of weft yarns 300 contains weft yarns 310, 320 (as know as fill or filling yarns) which are in an approximately perpendicular orientation (referred to as the cross-machine direction) relative to the warp yarns 210.

The warp yarns 210 can be in any suitable shape and size that produces the desired physical attributes in the finished product. Preferably, the warp yarns 210 comprise monofilament yarns and in another preferred embodiment, essentially all (defined as at least 95% by number), or all of the warp yarns 210 are monofilament yarns. The monofilament yarns provide strength and some amount of stiffness in the machine direction of the belt to minimize sagging of the belt between rollers in the system. Monofilaments also absorb and hold less water than comparable weights of multifilament yarns which may be advantageous in some applications where it is desirable to drain water from the belt. The warp yarns 210 have a first denier, preferably between about 200 and 1,000 denier, more preferably between about 400 and 800 denier.

The weft yarns 310, 320 can be in any suitable shape and size that produces the desired physical attributes in the finished product. Preferably, the weft yarns 310, 320 are in a repeating pattern of at least one monofilament weft yarn 310 followed by at least one multifilament weft yarn 320. In one preferred embodiment, the weft yarns 310, 320 are in an alternating pattern comprising one monofilament yarn 310 and one multifilament yarn 320. In one preferred embodiment, the weft yarns 310, 320 are in an alternating pattern consisting of one monofilament yarn 310 and one multifilament yarn 320. In alternative embodiments, the repeating pattern may be one or multiple monofilament yarns 310 (1, 2, 3, 4, or more) followed by one or more multiple multifilament yarns 320 (1, 2, 3, 4, or more).

The monofilament weft yarns 310 have a second denier, preferably at least about 2,500 denier, more preferably at least about 4,000 denier. In another embodiment, the monofilament weft yarns 310 have a denier in the range of about 2,500 to 10,000 denier. These large denier monofilament yarns provide stability and some rigidity in the cross-machine direction and may reduce sagging during use. Preferably, the monofilament weft yarns 310 have a denier of at least about 5 times the denier of the monofilament warp yarns 210. In another embodiment, the monofilament weft yarns 310 have a denier of at least about 8 times the denier of the monofilament warp yarns 210.

The multifilament weft yarns 320 are preferably textured. In one embodiment, the multifilament weft yarns 320 are 2 ply 300 denier yarns. In one embodiment, the multifilament weft yarns 320 are double or multiple inserted. The terms "multiple-insertion" and "double-insertion" are intended to include (a) multiple filling yarns inserted in the shed of the loom together; (b) multiple filling yarns inserted separately, while the shed of the loom remains the same; and (c) multiple filling yarns inserted separately, where the shed of the looms remains substantially the same, that is, the position of 25% or less of the warp yarns are changed between insertions of the yarns. Having yarns be double inserted allows for the yarn size to be doubled (or tripled, etc) up such that the effective "yarn" in that weft location has a large diameter and denier. In other embodiments, a larger denier multifilament weft can be used instead of double or multiple insertion.

Preferably, the weft 310, 320 and warp yarns 210 comprise a plurality of synthetic yarns. The synthetic yarns can comprise any suitable synthetic fibers. Preferably, the synthetic yarns comprise fibers selected from the group consisting of polyamide fibers (e.g., nylon 6 fibers, nylon 6,6 fibers), polyester fibers (e.g., polyethylene terephthalate fibers, polytrimethylene terephthalate fibers, polybutylene terephthalate fibers), polyolefin fibers, and mixtures thereof.

In a more preferred embodiment, the synthetic yarns comprise fibers selected from the group consisting of polyamide fibers, polyester (PET) fibers, polyolefin fibers, polytrimethylene terephthalate (PTT), and mixtures thereof. Preferably, all of the yarns (warp and weft) in the woven fabric consist essentially of PET yarns (consisting essentially of means greater than 98% by number of the yarns are PET yarns). PET yarns have good strength and cost and having all of the yarns be PET yarns increases the recyclability of the belt at the end of its useful life.

The woven fabric 100 can be any suitable woven fabric having an inner side and an outer side. The woven fabric also has approximately parallel straight sides and ends. Such woven fabrics comprise a plurality of yarns interlaced in a suitable weave pattern, such as a plain weave, leno weave, twill weave or a satin weave. Preferably, the woven fabric is constructed in a plain weave. A woven fabric typically has low elongation (stretching), high strength, and low production costs. Preferably, the warp direction of the woven fabric has a lower stiffness (and higher flexibility) than the weft direction of the woven fabric. In a preferred embodiment, the woven fabric has a flexibility in both the warp and weft directions such that the fabric can be bent to an angle of 170 degrees or more by hand.

Preferably, the warp yarns 210 have between about 20 and 80 ends per inch, more preferably about 30 to 50 ends per inch. Preferably, the weft yarns 310, 320 have between 10 and 40 picks per inch, more preferably between about 15 and 26 picks per inch. The terms "pick," "picks," "picks per inch" and "ppi" are intended to refer to (a) one filling yarn carried through a shed formed during the weaving process and interlaced with the warp yarns; and (b) two or more filling yarns carried through a shed during the weaving process, either separately or together, and interlaced with the warp yarns. Thus, for the purposes of determining the picks per inch of a woven fabric, multiple-inserted filling yarns are counted as a single pick.

Preferably, the weave is symmetric, meaning that the inner side and the outers side of the woven fabric look approximately the same and have the same surface roughness. In other embodiments, the weave is not symmetrical, meaning that the upper surface does not resemble the lower surface and the two surfaces have different surface roughness. In this embodiment, the upper surface preferably has the higher surface roughness.

In one embodiment, the woven fabric 100 contains a coating on at least one side. This coating may limit water uptake by the yarns of the woven fabric, prevent mold or microbials, protect the fabric from abrasion, or give any other suitable property to the woven fabric. The coating method used may be any suitable coating method, including but not limited to, gravure coating, knife coating, printing, and transfer coating. The coating may contain, but is not limited to, antioxidants, optical brighteners, anti-microbial agents, surfactants, colorants, fire retardants, and fluoropolymers.

The ends of the woven fabric 100 are releasably or permanently secured to form an endless loop or belt. Preferably, the endless loop has a length of at least about 3 meters, more preferably at least about 6 meters. In other embodiments, the endless look is much longer, typically about 10 meters or greater.

The endless belt can be used in any suitable system including algal growth systems, paper making systems, and more. The endless belt is well suited to an algal growth system as it contains a high amount of surface area, strength, and longevity. It is preferable for an algal growth system that the woven fabric be porous, allowing the water to drain though the fabric, but with the interstices between the yarns (holes in the fabric) being small enough that the algae does not simply fall through the fabric. More information about belt driven algal growth systems can be found in U.S. Pat. No. 9,932,549 which is herein incorporated by reference in its entirety.

EXAMPLE

A woven fabric was made using a Dornier style loom in a plain weave. The warp yarns were PET 520 denier monofilament yarns in a 45 ends per inch construction. The weft yarns were PET 5000 denier monofilament yarns alternated 1:1 with a double-inserted textured PET 2 ply 300 denier multifilament yarn in a 16 ends per inch construction. The resultant fabric has good stiffness, flexibility, porosity, openness and was suitable for use in algal growth systems.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as openended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above described elements in all possible variations thereof is encompassed by the present disclosure unless otherwise indicated herein or otherwise clearly contradicted by context.

What is claimed is:

1. A flexible belt comprising a woven fabric having parallel straight sides and ends, wherein the ends are releasably or permanently securable to one another to form an endless loop, wherein the woven fabric has an upper and lower surface, wherein the woven fabric comprises:
- a set of warp warps in a warp yarn direction, wherein the warp yarns comprise monofilament warp yarns having a first denier,
- a set of weft yarns in a weft yarn direction, wherein the weft yarn direction is perpendicular to the warp yarn direction, wherein the weft yarns are in a repeating pattern comprising at least one monofilament weft yarn followed by at least one multifilament weft yarn, wherein the monofilament weft yarn has a linear mass density of at least 2,500 denier and at least 5 times the denier of the monofilament warp yarn.

2. The flexible belt of claim 1, wherein the upper surface and lower surface of the woven fabric have the same surface roughness.

3. The flexible belt of claim 1, wherein the first denier is between 200 and 1,000 denier.

4. The flexible belt of claim 1, wherein the first denier is between 400 and 800 denier.

5. The flexible belt of claim 1, wherein the weft yarns are in a repeating pattern consisting of one monofilament weft yarn followed by one multifilament weft yarn.

6. The flexible belt of claim 1, wherein the monofilament warp yarns comprise polyester.

7. The flexible belt of claim 1, wherein the monofilament weft yarns comprise polyester.

8. The flexible belt of claim 1, wherein the multifilament weft yarns comprise polyester.

9. The flexible belt of claim 1, wherein the wrap and weft yarns consist essentially of polyester yarns.

10. The flexible belt of claim 1, wherein the endless loop has a length of at least 3 meters.

11. The flexible belt of claim 1, wherein the monofilament weft yarn has a linear mass density of at least 4,000 denier.

12. The flexible belt of claim 1, wherein the monofilament weft yarn has a denier of at least 8 times the denier of the monofilament warp yarn.

13. The flexible belt of claim 1, wherein the multifilament weft yarns are textured yarns.

14. The flexible belt of claim 1, wherein the multifilament weft yarns are double inserted.

15. An algal growth system comprising the flexible belt of claim 1.

* * * * *